(12) United States Patent
Wilczek et al.

(10) Patent No.: US 10,181,144 B2
(45) Date of Patent: Jan. 15, 2019

(54) EFFICIENT RESOURCE USAGE BY INTERRUPTION OF INTERCONNECTED PROCESSES

(71) Applicant: Coupa Software Incorporated, San Mateo, CA (US)

(72) Inventors: Donna Wilczek, San Mateo, CA (US); Scott Harris, San Mateo, CA (US)

(73) Assignee: Coupa Software Incorporated, San Mateo, CA (US)

(*) Notice: Subject to any disclaimer, the term of this patent is extended or adjusted under 35 U.S.C. 154(b) by 425 days.

(21) Appl. No.: 14/970,491

(22) Filed: Dec. 15, 2015

(65) Prior Publication Data
US 2017/0169487 A1 Jun. 15, 2017

(51) Int. Cl.
*G06Q 30/00* (2012.01)
*G06Q 30/06* (2012.01)

(52) U.S. Cl.
CPC .............................. *G06Q 30/0609* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| 2008/0288435 A1* | 11/2008 | Doss | G06Q 10/109 |
| | | | 706/47 |
| 2014/0257906 A1* | 9/2014 | Soubra | G06Q 10/1097 |
| | | | 705/7.21 |
| 2014/0258032 A1* | 9/2014 | Psota | G06Q 30/02 |
| | | | 705/26.35 |

* cited by examiner

*Primary Examiner* — Ethan D Civan
(74) *Attorney, Agent, or Firm* — Hickman Palermo Becker Bingham LLP (57) ABSTRACT

A method and system for interrupting interconnected processes are described. An interconnected process is a process that cannot progress unless another process is complete. A Supplier Information Management (SIM) computer is logically positioned between an accounts receivable computer and an accounts payable computer. The accounts receivable computer can use the SIM computer to perform business tasks that are processes interconnected with a profile management process. The profile management process ensures that the SIM computer has complete and up to date information about an entity using the accounts receivable computer. If the SIM computer does not have complete and up to date information, the processes corresponding to business processes are interrupted until such information is provided by the accounts receivable computer. Because business tasks cannot be completed without complete and up to date profile information, the accounts payable computer no longer receives incomplete documents like invoices for the accounts receivable computer.

20 Claims, 7 Drawing Sheets

EDITABLE FORM
300

REQUIRED PROFILE INFORMATION FORM 302

ACCOUNTS PAYABLE ENTITY: ACME CORP. 304

ACCOUNTS RECEIVABLE ENTITY: ______ 306

REQUIRED PROFILE FIELDS OR DOCUMENTS: 308

☒ TAX ID          ☒ REMIT TO ADDRESS     ☐ DIVERSITY CERTIFICATE     ☐ 1099 FORM
☐ W8 FORM         ☐ CERTIFICATE OF INS   ☐ STATE TAX FORM            ☐ W9 FORM
☐                 ☐                      ☐                            ☐

OPTIONAL PROFILE FIELDS OR DOCUMENTS: 310

☐ SHIPPING ADDRESS   ☐ LOGO    ☐ CERTIFICATE OF INSURANCE
☐                    ☐         ☐                            ☐

SET EXPIRATION 312

☐ 30 DAYS    ☐ 180 DAYS    ☐ 365 DAYS    ☐ CUSTOM SETTINGS

EDITABLE FORM
500

REQUIRED PROFILE INFORMATION FORM 502

ACCOUNTS RECEIVABLE ENTITY: WIDGETS, INC. 504

ACCOUNTS PAYABLE ENTITY: ACME CORP. 506

REQUIRED PROFILE FIELDS OR DOCUMENTS: 508

TAX ID 510  55-555555555   ☐ NO CHANGE 512

REMIT TO ADDRESS    514

PAYMENT PROCESSING DEPT.
WIDGETS, INC.
PO BOX 123456
ANYTOWN, USA

☐ ADDRESS NOT CHANGED 516

( EDIT PROFILE ) 518

FIG. 5

EDITABLE FORM 600

PROFILE INFORMATION FORM 602

ACCOUNTS RECEIVABLE ENTITY: WIDGETS, INC. 604

PROFILE FIELDS OR DOCUMENTS: 608

TAX ID 610 [ 55-555555555 ]   ☐ NO CHANGE 612

REMIT TO ADDRESS 614

[ PAYMENT PROCESSING DEPT.
WIDGETS, INC.
PO BOX 123456
ANYTOWN, USA ]

☐ ADDRESS NOT CHANGED 616

INSURANCE CERTIFICATE ☒ UPLOADED 618   ( UPLOAD NEW ) 620

DIVERSITY CERTIFICATE ☒ UPLOADED 622   ( UPLOAD NEW ) 624

STATE 1 TAX ID 626 [ 11-11111111 ]

STATE 2 TAX ID 628 [ 22-22222222 ]

LOGO 630 ( UPLOAD NEW ) 632

EFFICIENT RESOURCE USAGE BY INTERRUPTION OF INTERCONNECTED PROCESSES

TECHNICAL FIELD

The present disclosure relates generally to computer-implemented process management and data flow techniques. More specifically, the disclosure pertains to reduction of resource usage, such as reduction of usage of CPU resources, memory and network bandwidth, within interconnected computer processes in which certain computer-executed operations depend upon previously receiving specified data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Interconnected processes are processes that have more than one autonomous participant and where one process must be completed before another can progress. Each participant in the interconnected processes is responsible for performing one or more action. Interconnected processes slow or fail when a participant has not performed an action required of it. Stated another way, computer-executed operations are interconnected when a particular operation depends, for accurate execution or for execution at all, upon previously completing another computer operation or previously receiving a set of data. When the processes fail, unnecessary resources are consumed to provide a cure and resume at least one of the interconnected processes.

For example, invoice processing is an interconnected process that has at least two autonomous participants: a vendor computer and a buyer computer. When an invoice is generated and sent by the vendor computer, the buyer computer can process the invoice and send payment. However, if a vendor computer fails to provide a correct payment address, the buyer computer is unable to process the invoice and send payment. Thus, unnecessary resources are consumed by the buyer computer to request the correct payment address and by the vendor computer to provide the correct payment address before the buyer computer can send a payment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Many embodiments are described in the context of performing form processing on an invoice document because invoice documents have data and fields associated with the data in a template format and require certain information about the document creator before being deemed complete. However, it is understood that an invoice is only a specific type of form with features required in form processing such as extracting data and sending and receiving data through multiple file types and protocols. The same principles apply to other forms, such as legal forms, purchase orders, quality assurance checklists, requisition documents, flyers, postage, and questionnaires.

General Overview

In business transactions, after a contractual relationship is formed, participating entities or computers require certain information about one another to engage in a transaction and meet their obligations under the contract. Systems and methods described herein avoid the consumption of unnecessary resources to obtain the required information in a timely manner. The systems and methods operate to interrupt two interconnected processes: a task process such as invoice generation and a profile management process.

A supplier information management (SIM) computer communicates with an accounts payable computer at a buyer and an accounts receivable computer at a vendor to generate, validate, and process invoices. When an accounts receivable computer communicates with the SIM computer to initiate a task like invoice generation, the SIM computer checks that supplier profile information about the vendor is complete and updated. The supplier profile information may comprise a supplier record in a SIM database in which one or more fields or columns are filled or contain null values and thus are conceptually empty. Supplier profile information, also referred to herein as a vendor profile or vendor profile information, is complete when no fields in the record are empty or filled with sham data. Supplier profile information is deemed updated if it is recently provided or confirmed within a particular period of time. If the supplier profile information is not complete or updated, the SIM computer blocks the accounts receivable computer from performing the initiated task until the supplier profile information is complete and updated and may also trigger the operation of a presentation layer to prompt the accounts receivable computer at the vendor to provide the missing supplier profile information.

By blocking the vendor entity from performing a task until the supplier profile information is complete and updated, the computational task to provide the missing information to the SIM computer is transferred from the buyer entity to the vendor entity which is in possession of the supplier profile information. Therefore, the SIM computer at the buyer entity is not required to use CPU cycles, memory space, network bandwidth and other resources to create inquiry messages requesting supplier profile information, to contact the vendor entity and obtain this information via network messages or other data communications. The buyer entity also does not use or waste computing resources involved in initiating payables records or generating payments that cannot be completed because the supplier profile information is incomplete. The vendor entity further saves computing resources that otherwise would be spent contacting the buyer after an invoice is sent out if a payment is not received. Moreover, by virtue of having complete and updated information about vendors, the SIM computer operates more efficiently and uses less bandwidth.

Method of Interrupting Interconnected Processes

Figure 1:
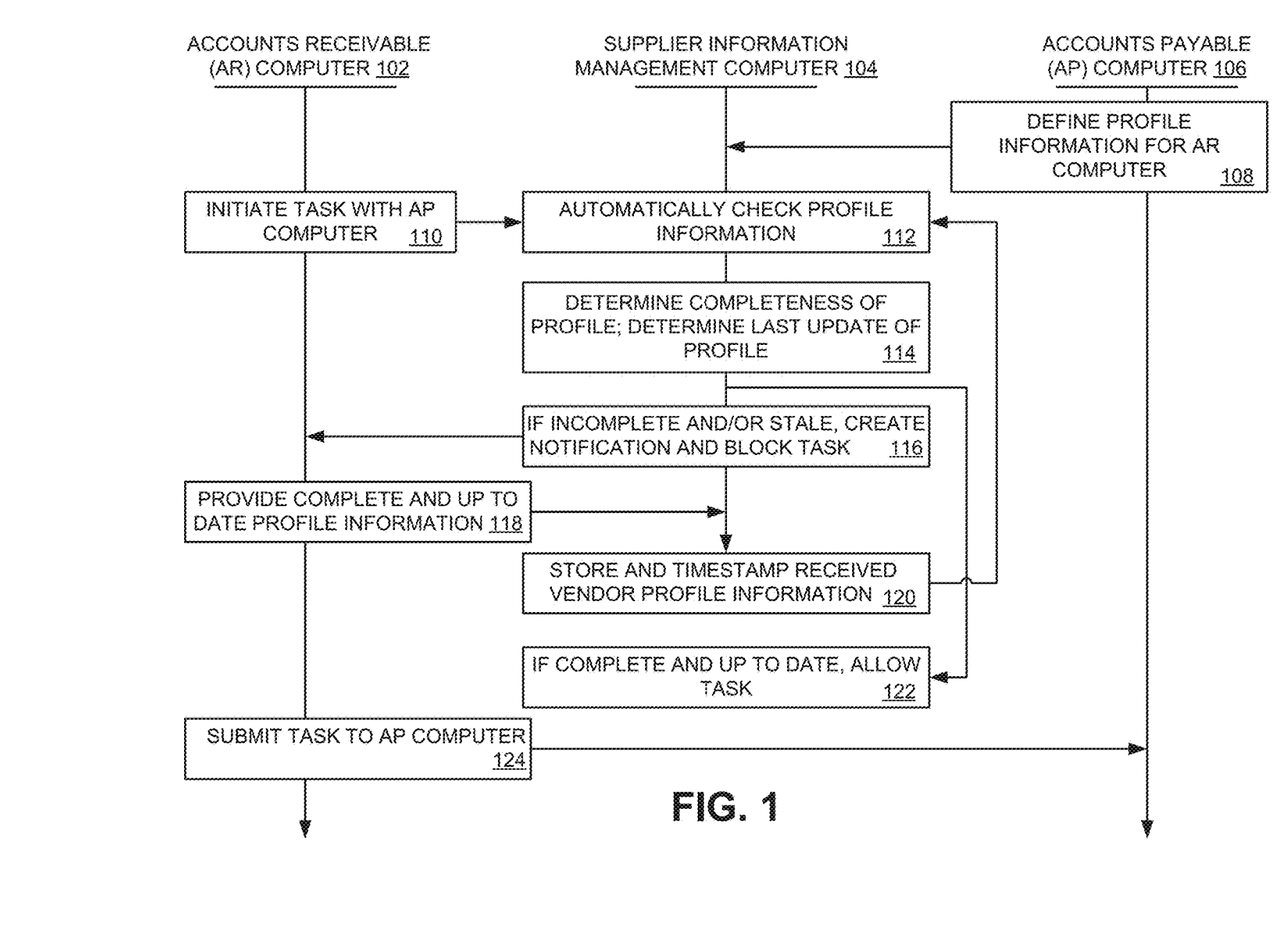
FIG. 1 is a flowchart of a method of interrupting an interconnected process, according to various embodiments.

FIG. 1 is a flowchart of a data processing algorithm or method of interrupting an interconnected process, according to various embodiments.

The method of FIG. 1 allows an accounts payable (AP) computer 106 to define profile information required from one or more accounts receivable (AR) computers 102. A supplier information management (SIM) computer 104 is logically positioned using data networks between the AR computer 102 and the AP computer 106 and all such computers are programmed to communicate using one or more data networks using protocols such as HTTP. The SIM computer 104 stores the profile definitions received from the AP computer 106 and verifies that the AR computer 102 submits complete and up to date profile information to the SIM computer 104. "Complete information," in this context, means that the supplier information includes current values for all available fields; in one embodiment, the information cannot contain expired documents. Thus if there was a request to update information, even if the information is potentially technically up-to-date, in some embodiments the next step in a workflow such as invoice processing will be stopped. The SIM computer 104 generates and sends invoices and other documents to the AP computer 106 on behalf of the AR computer 102. The AP computer 106 is separated from the acquisition and maintenance of profile information for the vendors contracted with by the buyer.

In an operation 108, the AP computer 106 defines supplier profile information for one or more AR computers 102 as each buyer may contract with the supplier. The profile definition may include information that can be entered directly into the SIM computer 104 via a web form or a file such as a comma-separated values (CSV) file. In other embodiments, the profile definition may specify one or more required documents to be uploaded to the SIM computer 104, such as tax or insurance documents. Elements of profile information may include name, address, tax identifier, payment terms, invoice format, and the like.

In various embodiments, the SIM computer 104 may specify one or more required elements of profile information that cannot be changed by the AP computer 106. These required elements are selected according to legal requirements pertaining to the type of contract or documents being generated on behalf of the AR computer 102. Examples include payment remittance information or a federal employer identification number (EIN). Payment remittance information can include a variety of payment options such as a remit to address, wire instructions, or credit card payment instructions.

The AP computer 106, as part of the operation 108, can define profile information required from each of the AR computers 102. The definition itself can be in the form of a completed editable form such as a web form or entered using a form such as a CSV form. The AP computer 106 can further specify a subset of AR computers 102 and profile information for the AR computers 102 in the subset. For example, a subset comprising vendors of goods may provide warranty information as part of the profile information while a subset comprising vendors of services may provide insurance information as part of profile information. A further subset of vendors who provide both goods and services may provide warranty information as well as insurance information. The AP computer 106 may further define profile information on a vendor by vendor basis.

As part of defining the profile information, the AP computer 106 may further specify one or more expiration dates or time-to-live (TTL) dates for the information in the profile. An expiration date may apply to an entire profile information record, or to individual fields within a record. After the expiration date, the profile information submitted by the AR computer is deemed out of date. Portions of the profile information can expire at different times, as defined by the AP computer 106. For example, information that stays the same, such as EIN, may have a later expiration date than information that changes frequently, such as sales tax. The AR computer 106 can set expiration dates for each vendor, a subset of vendors, or as default values for all vendors.

In an operation 110, the AR computer 102 initiates a task at the SIM computer 104 directed to sending one or more documents to the AP computer 108. The tasks include, for example, invoice generation, catalog generation, purchase order generation, or response to a sourcing event including submitting a bid. The task may be initiated using an application installed at the AR computer 102 or using a browser-based service to communicate with the SIM computer 104 or to communicate with an application server computer that provides supply management functions using software as a service (SaaS) over a network.

In an operation 112, once the SIM computer 104 receives a message indicating that the task has been initiated, the SIM computer 104 automatically, without human intervention, checks that the profile information of the vendor corresponding to the AR computer 102. The SIM computer 104 performs the check by identifying the AR computer 102 using, for example, login information or another identifier, such as an IP address. The check then proceeds by retrieving from memory defined profile information received from the AP computer 106 corresponding to the initiated task. The defined profile information may comprise default fields and custom fields selected based on one of more subsets to which the vendor belongs. The SIM computer 104, for each field included in the defined profile information, accesses a record associated with the vendor corresponding to the AR computer 102. The SIM computer 104 may retrieve all or a subset of the fields associated with the record.

In an operation 114, using the retrieved record, the SIM computer 104 determines completeness of the supplier profile stored at the SIM computer 104 in relation to the defined profile information and a last update of the vendor profile. The completeness of the profile is based on verifying that, for each field in the defined profile information for the vendor, valid data is entered into the field. Valid data is determined using one or more heuristics such as checking that a seven digit phone number does not begin with the sequence "555" or that the street address includes both a street number and a street name. Data identified as not valid, also referred to as sham data, is incomplete.

The last update of the vendor profile is a previous time and date when new information was added to the vendor profile or when the AR computer previously confirmed the data in the existing vendor profile. The last update is compared to the expiration date(s) associated with the defined profile information. When the expiration date is expressed as a time interval, like 30, 180, or 365 days, the current date and the date of the last update are compared to determine if the interval has elapsed. If the vendor profile is complete and up to date, the method 100 proceeds to operation 122, described below.

If the vendor profile is not complete or up to date, the method 100 proceeds to operation 116 where the SIM computer 104 creates and sends a notification indicating that the vendor profile information is incomplete or stale and/or blocks the initiated task from being performed and/or blocks any further progress towards completing the initiated task. The particular operation performed as operation 116 may vary in different embodiments. The notification may include a description of the fields that are deemed incomplete or not up to date and one or more options for completing or updating the vendor profile, including an option to confirm a previously stored vendor profile. The notification may be generated using a presentation layer, using HTML elements in dynamic web pages, using e-mail, text messaging, and the like. In an embodiment, the notification may be a windowed, pop-up notification message within the same system in which the vendor is attempting to initiate an operation as described above for operation 110.

The SIM computer 104 sends the notification to the AR computer 102. In operation 118, the AR computer 102 provides complete and up to date information for the vendor profile. The AR computer 102 may add information for the vendor profile via an editable web form or a file, such as a CSV file. The AR computer 102 may submit copies of one or more documents specified by the defined profile information. In some instances where the information is not up to date and has not changed, the AR computer 102 may confirm the vendor profile without making any other changes.

In operation 120, the SIM computer 104 stores and timestamps the profile information of the operation 118. The timestamp can be referred to when determining whether the vendor profile is out of date. The method 200 then returns to the operation 112 to confirm that the vendor profile is complete and up to date. Operations 112-120 can be repeated until the vendor profile is deemed to be complete and up to date.

In operation 122, performed after operation 114 if the vendor profile stored at the SIM computer 104 is complete and up to date, the SIM computer 104 allows the task initiated in the operation 110 to be completed or to otherwise progress. In operation 124, the AR computer 102 completes the task and submits the task to the AP computer 106.

In this way, the AR computer 102 is forced to provide complete profile information before performing a task for its benefit. The AR computer 102 cannot initiate or perform a task, such as creating an electronic invoice, that ultimately cannot be completed in downstream payment operations by the AP computer because essential vendor data is missing. Further, the AP computer 106 does not receive any incomplete or out of date data, and operates more efficiently because the AP computer is not required to interrogate or prompt the AR computer 102 to provide data that is necessary or essential yet missing from the supplier information record.

Thus, method 100 provides technological solutions for problems that are inherent in networked supply management computer systems in which specified computer-executed operations are dependent upon previously receiving a dataset. These solutions reduce the amount of time and effort buyer entities expend gathering, updating, and maintaining this information about vendors. By blocking the vendor entity from performing a task until the supplier profile information is complete and updated, the computational task to provide the missing information to the SIM computer is transferred from the buyer entity to the vendor entity which is in possession of the supplier profile information, the SIM computer at the buyer entity is not required to use CPU cycles, memory space, network bandwidth and other resources to create inquiry messages requesting supplier profile information, to contact the vendor entity and obtain this information via network messages or other data communications. The buyer entity also does not use or waste computing resources involved in initiating payables records or generating payments that cannot be completed because the supplier profile information is incomplete. The vendor entity further saves computing resources that otherwise would be spent contacting the buyer after an invoice is sent out if a payment is not received. Moreover, by virtue of having complete and updated information about vendors, the SIM computer operates more efficiently and uses less bandwidth.

Computer Systems

Figure 2:
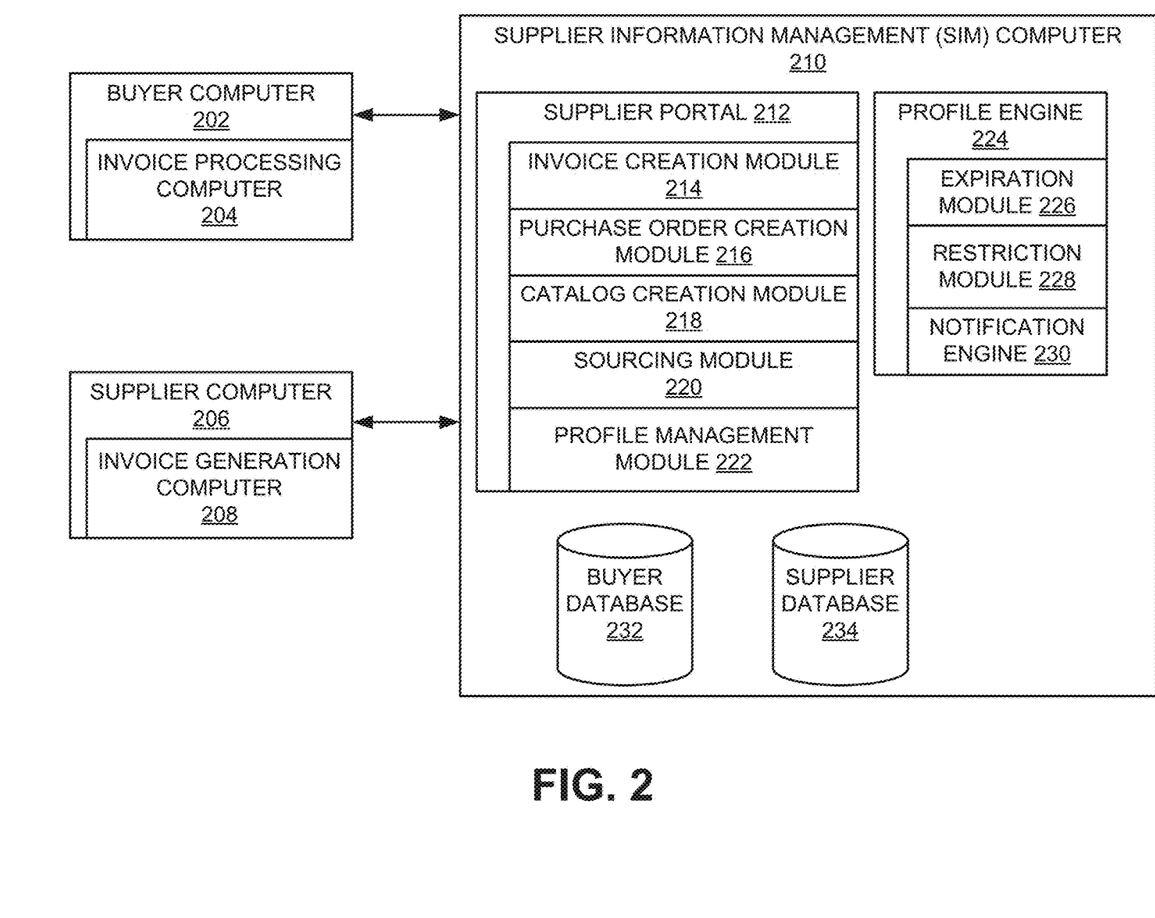
FIG. 2 is a block diagram of computer systems involved in the interconnected process, according to various embodiments.

FIG. 2 is a block diagram of computer systems involved in the interconnected process, according to various embodiments.

The computer systems comprise a buyer computer 202, a supplier computer 206, and a SIM computer 210. These computers, operating in concert, perform one or more interconnected processes to perform business tasks. The interconnected processes include, but are not limited to, invoice generation, purchase order creation, catalog generation, sourcing, and profile management. Some of these processes can be interconnected, meaning that one process cannot proceed unless another process has completed. For example, an invoice creation process cannot proceed unless a profile management process is complete. Other processes may be interconnected as well even though their respective interconnections are not explicitly described.

Buyer computer 202 is one or more computers associated with a buyer entity. The one or more computers can include, for example, an invoice processing computer 204. The invoice processing computer 204 may be the AP computer 106 that defines the profile information but may be a separate computer dedicated to processing received invoices. The invoice processing computer 204 is reliant on the information included in an invoice being complete and up to date. If the information is neither, the invoice processing computer 204 is unable to process the invoice and a user is required to obtain this information directly from the vendor. If the invoice is complete, the invoice processing computer 204 can process and approve or reject the invoice. Because the SIM 210 is involved in invoice generation, the invoice processing computer 204 does not receive invoices having incomplete or not up to date information, as defined by the defined vendor profile.

Supplier computer 206 is one or more computers associated with a supplier entity. The one or more computers can include, for example, an invoice generation computer 208. The invoice generation computer 208 may be the AR computer 102 that provides the vendor profile, also referred to as a supplier profile, but may be a separate computer dedicated to generating invoices. The invoice generation computer 208 operates under the assumption that vendor profile information at the SIM computer 210 is complete and up to date. If the information is neither, the invoice generation computer 208 cannot proceed with invoice generation and a user at the supplier is required to obtain this information before creating or sending an invoice.

SIM computer 210 is logically positioned between the buyer computer 202 and the supplier computer 206. The SIM computer 210 can be used by the supplier computer 206 to perform one or more business tasks. Some tasks may be interconnected, as described herein in connection with invoice processing and profile management. Other tasks may also be interconnected with profile management, at least as described herein.

A supplier portal 212 provides functionalities used to perform various business tasks. The supplier portal 212 can be accessed by the supplier computer 206 to streamline, standardize, and act as quality control for performing the business tasks. In some embodiments, the supplier portal 212 comprises one or more modules each for performing a process that achieves a task. The modules included in FIG. 2 are not exhaustive. "Module," in this context, means a region of main memory, or non-volatile storage such as disk or NVRAM, that stores instructions which when executed by the SIM computer 210 cause the SIM computer to execute the operations that are described herein according to the processes, operations and algorithms that are described. The functional descriptions in this section relating to operations and processes of the modules are intended to identify specific algorithms that can be programmed, using computer-executed instructions, to perform the specified operations and processes. "Module," as used herein, also may refer to the content and organization of computer programs in source code format that contain programming instructions that are organized or configured to be compiled or interpreted into executable instructions which when executed by the SIM computer 210 cause the SIM computer to execute the operations that are described herein according to the processes, operations and algorithms that are described.

An invoice creation module 214 is configured or programmed to execute a process that performs an invoice creation task. The invoice creation module 214 can receive a request to initiate the invoice creation task from the invoice generation computer 208. In some embodiments, the invoice creation module 214 completes an invoice template based on a vendor profile and additional information received from the supplier computer 206. The profile management process and the invoice creation process are interconnected.

A purchase order creation module 216 is configured or programmed to execute a process that performs a purchase order creation task. The purchase order creation module 216 can receive a request to initiate the purchase order creation task from the supplier computer 206. In some embodiments, the purchase order creation module 216 completes a purchase order template based on a vendor profile and additional information received from the supplier computer 206. The profile management process and the purchase order creation process are interconnected.

A catalog creation module 218 is configured or programmed to execute a process that performs a catalog creation task. The catalog creation module 218 can receive a request to initiate the catalog creation task from the supplier computer 206. In some embodiments, the catalog creation module 218 completes a catalog template based on a vendor profile and additional information received from the supplier computer 206. The profile management process and the catalog creation process are interconnected.

A sourcing module 220 is configured or programmed to execute a process that performs a sourcing task such as creating and submitting a bid. The sourcing module 220 can receive a request to initiate the sourcing task from the supplier computer 206. In some embodiments, the sourcing module 220 completes a bid template based on a vendor profile and additional information received from the supplier computer 206. In some instances, without complete and up to date vendor information, the SIM computer 210 may block the supplier computer 206 from receiving an invitation to bid or otherwise participate in the bidding process. The profile management process and the sourcing process are interconnected.

A profile management module 222 is configured or programmed to execute a process that performs tasks such as receiving a definition of a vendor profile and verifying that the vendor profile is complete and up to date. In some embodiments, the profile management module 222 sets a default definition of a vendor profile or automatically populates information into the vendor profile. The profile management module 222 can block the performance of other business tasks if the information is not complete and up to date.

A profile engine 224 may be separate from, or part of, the profile management module 222. The profile engine 224 executes one or more processes to interrupt processes interconnected with the profile management process. The profile engine 224 comprises an expiration module 226, a restriction module 228, and a notification engine 230. The expiration module 226 is configured or programmed to confirm that none of the data in the vendor profile is out of date by comparing a timestamp of the most recently received data to a current date and an expiration period included in the defined vendor profile. The restriction module 228, if the vendor profile is not complete or not up to date, instructs another module in the supplier portal 212 to interrupt or block the supplier computer 206 from performing a task. The restriction module 228 may override other processes being performed by the SIM computer 210 or the supplier computer 206 until the vendor profile is complete and up to date. The notification engine 230 generates a notification for the supplier computer 206 indicating that the vendor profile is not complete or not up to date. In some instances, the notification can highlight specific fields that are not complete or up to date.

A buyer database 232 stores definitions of vendor profiles received from the buyer computer 202. The defined vendor profiles indicate which fields of a vendor profile are mandatory or optional for each supplier, for a subset of suppliers, or for individual suppliers. The fields can each be associated with expiration data.

A supplier database 234 stores information included in vendor profiles. The information included in each vendor profile can be specific to one or more buyers or can be global for all buyers. The vendor profiles include timestamps associated with the information contained therein.

Vendor Profile Definition Form

Figure 3:
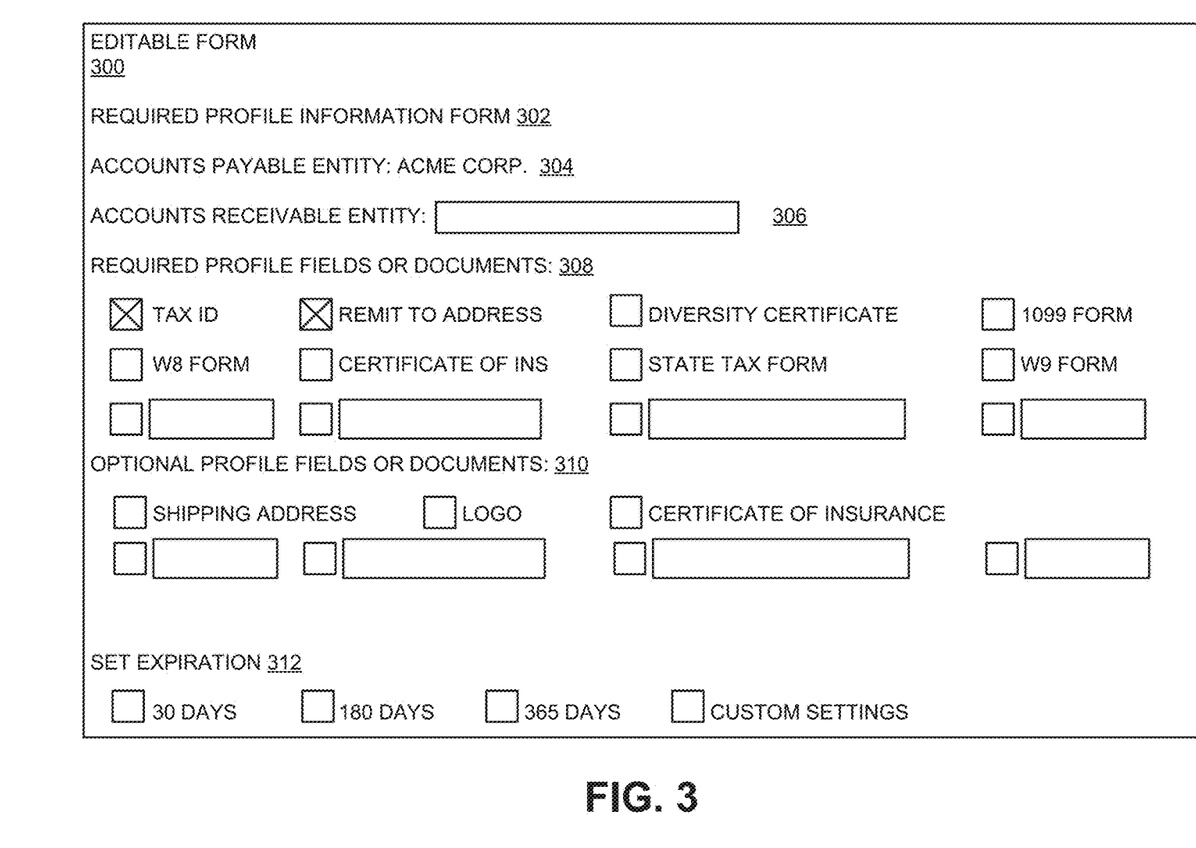
FIG. 3 is an example portion of an editable form edited by an accounts payable computer to define profile information for an accounts receivable computer, according to various embodiments.

FIG. 3 is an example portion of an editable form 300 edited by an accounts payable computer to define profile information for an accounts receivable computer, according to various embodiments. The editable form 300 is provided for illustration and is not intended to be limiting.

The editable form 300 comprises required profile information form 302 and indicates that the accounts payable entity 304, which is the entity defining the vendor profile, is Acme Corp. The field 304 is not editable by the accounts payable computer 106. An accounts receivable entity field 306 allows the AP computer to indicate one or more AR entities to which the resulting definition of the vendor profile applies. If the field 306 is left blank, the definition will be a default definition for each vendor.

In a section 308, the user of the AP computer can select a plurality of profile fields or specify one or more documents that are required by the buyer. In the editable form 300, the fields "Tax ID" and "Remit To Address" are pre-selected and cannot be unselected because these fields are required by the SIM computer. Other common fields or documents, such as diversity certificate, can be associated with a selectable checkbox to indicate that these are required by the buyer. The section 308 includes four customizable fields indicated by blank boxes in which the AP computer can enter in additional requirements.

In section 310, additional selections are provided for fields in the definition of the vendor profile that are optional or not required. If a vendor does not meet these requirements, interconnected processes are not interrupted. Like section 308, some fields are pre-populated and some fields are customizable.

In section 312, an AP computer can select an expiration period for information received from the vendor. The entirety of the information in the vendor profile can have a same expiration date based on the selected intervals or custom settings can be used to set different expiration dates for different fields (not depicted).

Supplier Notifications

Figure 4:
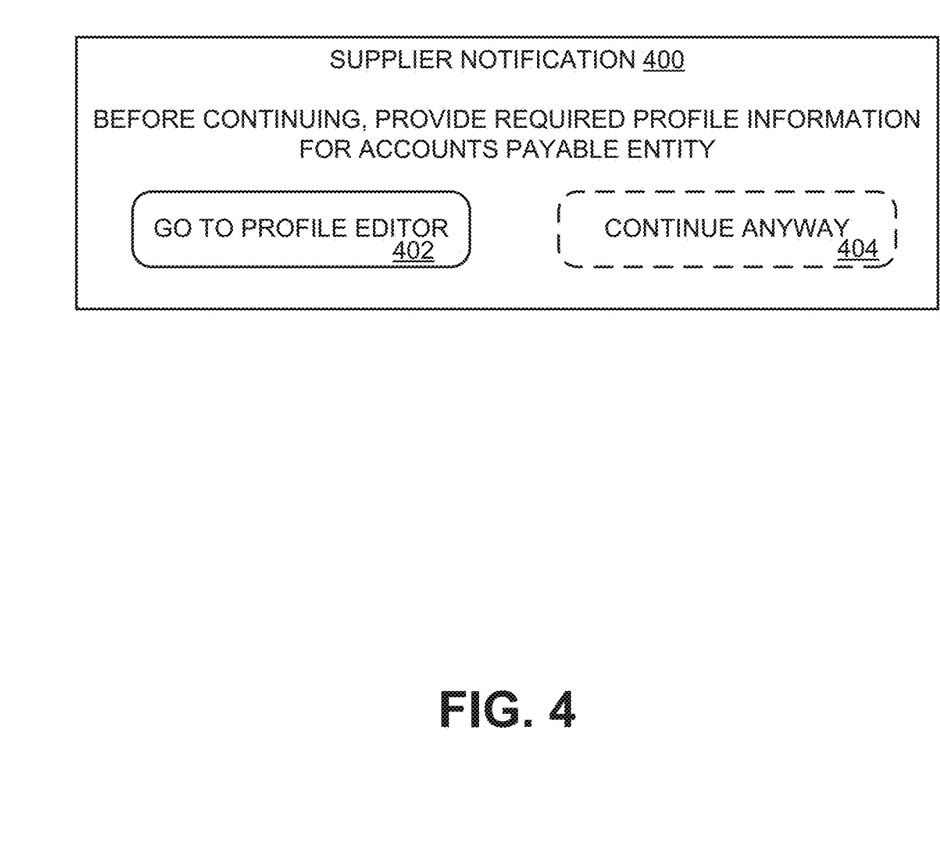
FIG. 4 is an example portion of a supplier notification, according to various embodiments.

FIG. 4 is an example portion of a supplier notification 400, according to various embodiments. The supplier notification 400 is sent by the SIM computer to the AR computer if the vendor profile is deemed to be incomplete or out of date. The notification 400 states that "Before continuing, provide required profile information for Accounts Payable Entity." Other embodiments may comprise a detailed listing of profile information to be provided or confirmed. A button 402 navigates the AR computer to a profile editor editable form.

An optional button 404, "continue anyway", may allow the AR computer to proceed with the task but not ultimately send any documents to the AP computer. For example, some tasks may be time sensitive or require extended periods of time to prepare. Thus, continuing with the task anyway, but not completing the task, may be a reasonable course of action. In some instances, a user of the AR computer may not have access to the required information and may need to redirect the request for profile information to someone who is currently unavailable. Thus, the user of the AR computer can continue working. Again, however, the SIM computer does not allow the AR computer to complete the task without complete and up to date profile information.

Vendor Profile Form

Figure 5:
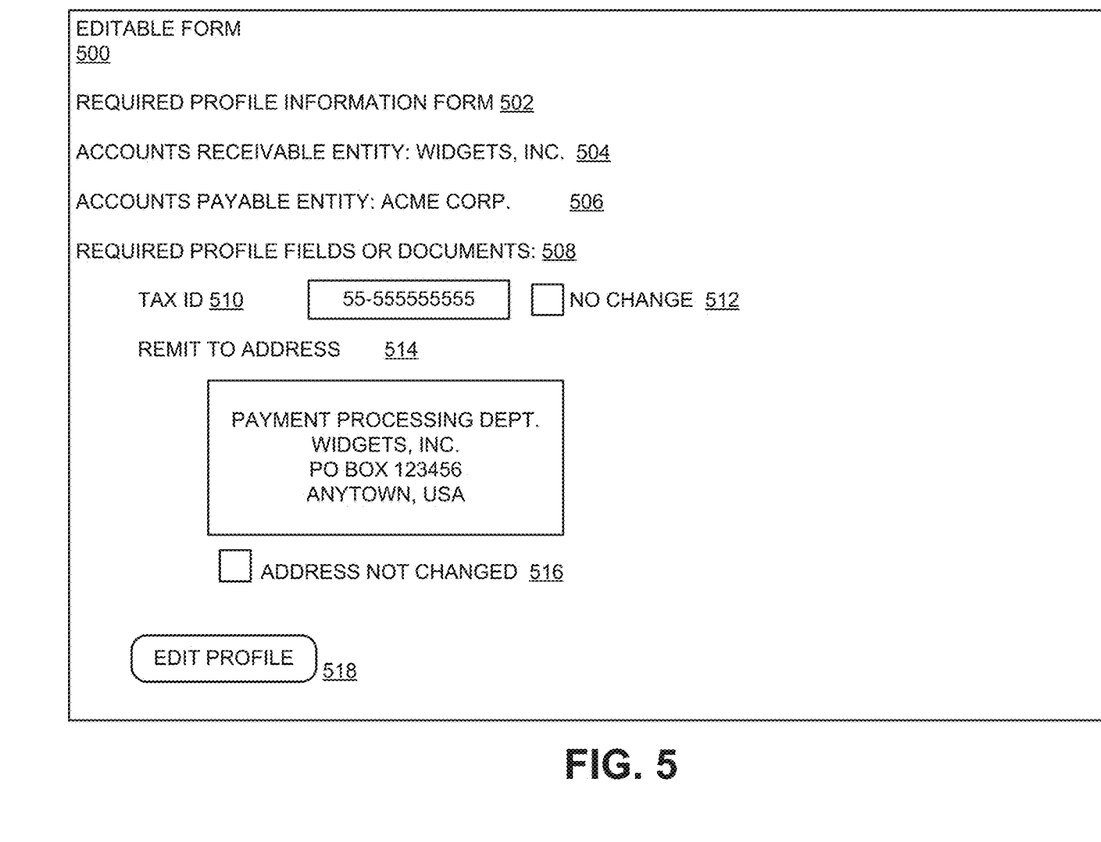
FIG. 5 is an example portion of an editable form edited by an accounts receivable computer to provide profile information for an accounts payable computer, according to various embodiments.

FIG. 5 is an example portion of an editable form 500 edited by an accounts receivable computer to provide profile information for an accounts payable computer, according to various embodiments. The required profile information 502 is specific to the business relationship between the AP entity Acme Corp. and the AR entity Widgets, Inc. as indicated by fields 506 and 504, respectively.

The form 500 comprises section 508 that lists required fields or information. As shown in the figure, a tax ID is required in field 510, with an option 512 to confirm that it has not changed, that when selected resets the expiration period. The section 508 further lists a remit to address as a required field, along with an option 516 to confirm that it has not changed, that when selected resets the expiration period. A button 518 provides an option to edit this profile information.

Figure 6:
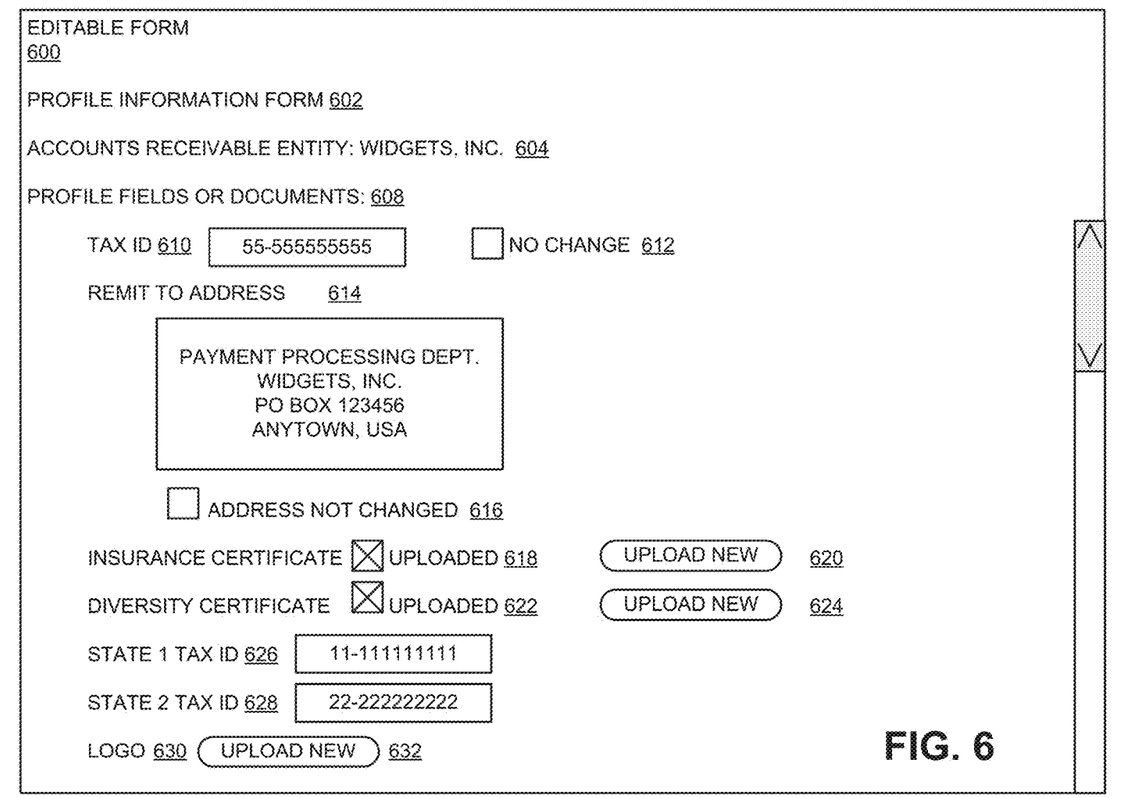
FIG. 6 is an example portion of an editable form edited by an accounts receivable computer to provide profile information accessible by a plurality of accounts payable computers, according to various embodiments.

FIG. 6 is an example portion of an editable form 600 edited by an accounts receivable computer to provide profile information accessible by a plurality of accounts payable computers, according to various embodiments. The profile information can be used to populate profile definitions for the AP computers that have a business relationship with the AR entity. The profile information 602 includes an identifier 604 of the AP entity, Widgets, Inc.

Section 608 includes a listing of profile fields that can be filled by the AP computer. A tax ID field 610 is shown, along with an option 612 to confirm that it has not changed, that when selected resets the expiration period for the plurality of accounts payable computers. A remit to address field 614 is shown, along with an option 616 to confirm that it has not changed, that when selected resets the expiration period for the plurality of accounts payable computers.

Form 600 includes fields for uploaded documents such as field 618 for insurance certificate, along with an option 620 to upload a new insurance certificate, and field 622 for diversity certificate, along with an option 624 to upload a new diversity certificate.

Fields 626 and 628 can be used to enter in tax IDs for different states.

Field 630 for logo includes an option 632 to upload a logo for the AR entity to the SIM computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
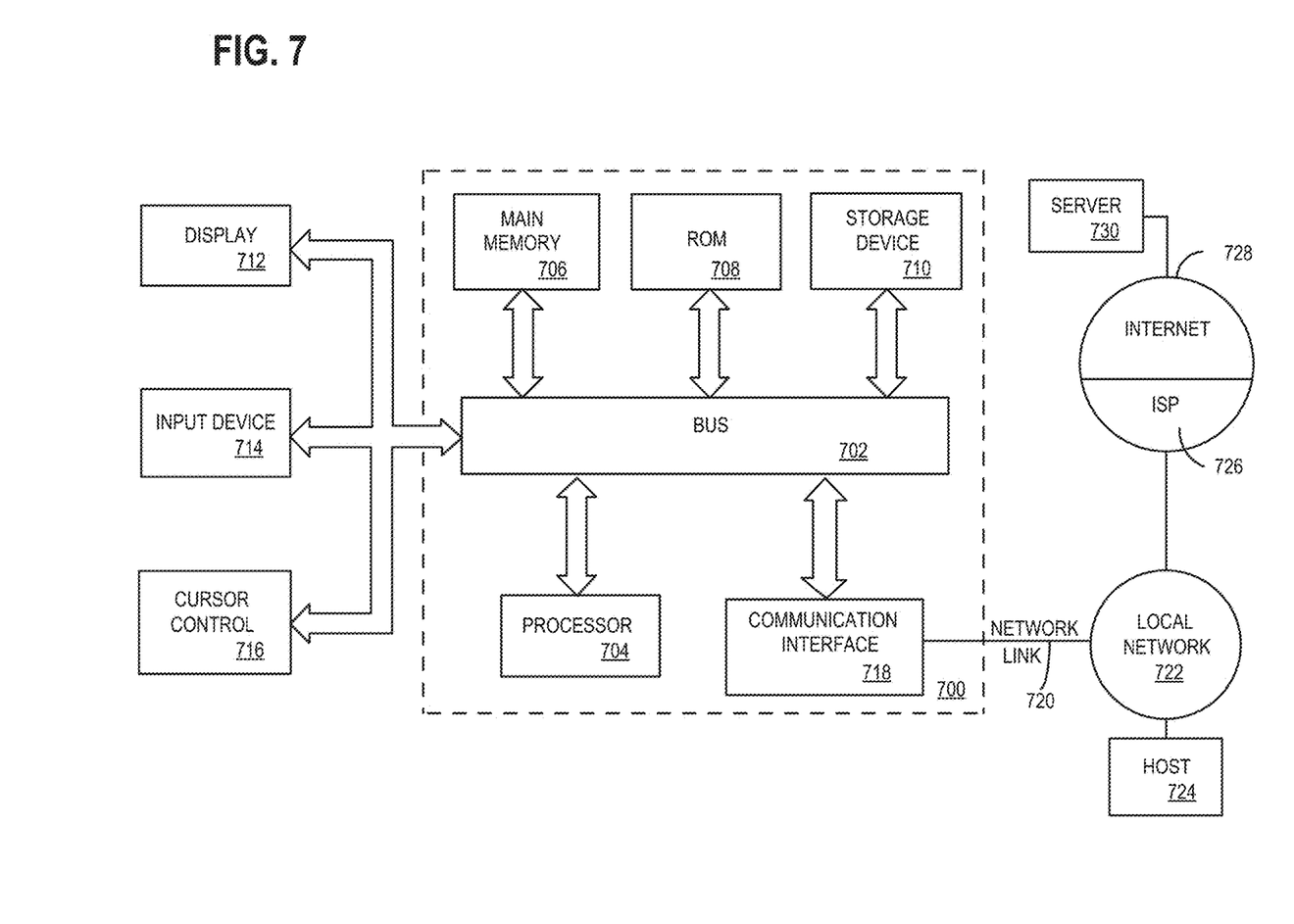
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a supplier information management computer, receiving, from a buyer computer, a supplier profile definition defining a supplier profile comprising a form having a plurality of fields to be completed by supplier computers;
   using the supplier information management computer, receiving a task instruction from a supplier computer to perform a task associated with the buyer computer;
   using the supplier information management computer, in response to receiving the task instruction from the supplier computer, determining whether the supplier profile is incomplete by identifying one or more empty fields of the plurality of fields that are missing a field value or one or more stale fields that have an expired field value;

using the supplier information management computer, in response to determining that the supplier profile is incomplete, blocking the supplier computer from performing the task until the supplier computer completes the supplier profile and otherwise allowing the task.

2. The method of claim 1, further comprising adding one or more required elements to the supplier profile definition that cannot be changed by the buyer computer.

3. The method of claim 1, wherein the instruction defining the supplier profile identifies a first subset of fields of the plurality of fields as mandatory and a second subset of fields of the plurality of fields as optional; and wherein determining the supplier profile is incomplete comprises:

determining that one or more of the first subset of fields is missing a field value or has an expired field value;

determining that one or more of the second subset of fields is complete even if the one or more of the second subset of fields is missing a field value or has an expired field value.

4. The method of claim 1, wherein the task is creating an invoice, creating a purchase order, creating a catalog, or sourcing a bid on a project.

5. The method of claim 1, further comprising:

before determining that the supplier profile is incomplete, allowing the supplier computer to at least partially perform the task without communicating the task to the buyer computer.

6. The method of claim 1, further comprising:

in response to determining that the supplier profile is incomplete, sending the supplier computer a notification that the supplier profile is incomplete, the notification identifying the identified fields of the plurality of fields.

7. The method of claim 1, further comprising:

after blocking the supplier computer, receiving field values corresponding to the identified fields from the supplier computer;

in response to receiving the field values, adding the received field values to the supplier profile and allowing the task.

8. The method of claim 7, further comprising:

assigning a timestamp to the received field values;

repeating the receiving and determining steps of claim 1, including determining that the supplier profile is incomplete when the timestamp of the received field values is older than a specified staleness value.

9. The method of claim 7, further comprising:

after receiving the field values, allowing the supplier computer to complete the task, wherein completing the task comprises populating a form with at least one field value corresponding to a field of the plurality of fields.

10. The method of claim 1, wherein the supplier profile comprises an expiration date associated with each field of the plurality of fields, and further comprising determining that the supplier profile is incomplete when the expiration date associated with each field of the plurality of fields is older than a specified staleness value.

11. A system comprising:
one or more processors;
a non-transitory computer-readable medium having instructions embodied thereon, the instructions, when executed by the one or more processors, cause:

using a supplier information management computer, receiving, from a buyer computer, a supplier profile definition defining a supplier profile comprising a form having a plurality of fields to be completed by supplier computers;

using the supplier information management computer, receiving a task instruction from a supplier computer to perform a task associated with the buyer computer;

using the supplier information management computer, in response to receiving the task instruction from the supplier computer, determining whether the supplier profile is incomplete by identifying one or more empty fields of the plurality of fields that are missing a field value or one or more stale fields that have an expired field value;

using the supplier information management computer, in response to determining that the supplier profile is incomplete, blocking the supplier computer from performing the task until the supplier computer completes the supplier profile and otherwise allowing the task.

12. The system of claim 11, further comprising adding one or more required elements to the supplier profile definition that cannot be changed by the buyer computer.

13. The system of claim 11, wherein the defining the supplier profile identifies a first subset of fields of the plurality of fields as mandatory and a second subset of fields of the plurality of fields as optional; and wherein determining the supplier profile is incomplete comprises:

determining that one or more of the first subset of fields is missing a field value or has an expired field value;

determining that one or more of the second subset of fields is complete even if the one or more of the second subset of fields is missing a field value or has an expired field value.

14. The system of claim 11, wherein the task is creating an invoice, creating a purchase order, creating a catalog, or sourcing a bid on a project.

15. The system of claim 11, wherein the instructions, when executed by the one or more processors, further cause:

before determining that the supplier profile is incomplete, allowing the supplier computer to at least partially perform the task without communicating the task to the buyer computer.

16. The system of claim 11, wherein the instructions, when executed by the one or more processors, further cause:

in response to determining that the supplier profile is incomplete, sending the supplier computer a notification that the supplier profile is incomplete, the notification identifying the identified fields of the plurality of fields.

17. The system of claim 11, wherein the instructions, when executed by the one or more processors, further cause:

after blocking the supplier computer, receiving field values corresponding to the identified fields from the supplier computer;

in response to receiving the field values, adding the received field values to the supplier profile and allowing the task.

18. The system of claim 17, wherein the instructions, when executed by the one or more processors, further cause:

assigning a timestamp to the received field values;

repeating the receiving and determining steps of claim 1, including determining that the supplier profile is incomplete when the timestamp of the received field values is older than a specified staleness value.

19. The system of claim 17, wherein the instructions, when executed by the one or more processors, further cause:
after receiving the field values, allowing the supplier computer to complete the task,
wherein completing the task comprises populating a form with at least one field value corresponding to a field of the plurality of fields.

20. The system of claim 11, wherein the supplier profile comprises an expiration date associated with each field of the plurality of fields, and further comprising determining that the supplier profile is incomplete when the expiration date associated with each field of the plurality of fields is older than a specified staleness value.

* * * * *